US012777119B1

(12) United States Patent
Abburi et al.

(10) Patent No.: US 12,777,119 B1
(45) Date of Patent: Oct. 27, 2026

(54) MATCHED TELEPHONE ROUTING

(71) Applicant: UIPCO, LLC, San Antonio, TX (US)

(72) Inventors: Madhusudhana Rao Abburi, San Antonio, TX (US); Dwayne Phillip Wilson, Crossroads, TX (US); Brian Howard Katz, San Antonio, TX (US); Paul Joseph Astwood, San Antonio, TX (US); Christopher Russell, The Colony, TX (US); Kristina Suniga-Cabrera, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 153 days.

(21) Appl. No.: 18/646,905

(22) Filed: Apr. 26, 2024

Related U.S. Application Data

(60) Provisional application No. 63/498,746, filed on Apr. 27, 2023.

(51) Int. Cl.

| | |
|---|---|
| ***H04M 3/42*** | (2006.01) |
| *G06Q 30/01* | (2023.01) |
| *H04M 7/00* | (2006.01) |

(52) U.S. Cl.
CPC ... *H04M 3/42195* (2013.01); *H04M 3/42221* (2013.01); *G06Q 30/01* (2013.01); *H04M 7/006* (2013.01)

(58) Field of Classification Search
CPC .. H04L 63/0876; H04L 65/1069; H04L 67/02
See application file for complete search history.

(56) References Cited

U.S. PATENT DOCUMENTS

| | | | | |
|---|---|---|---|---|
| 9,172,802 | B1 * | 10/2015 | Hopkins | H04M 3/523 |
| 11,763,319 | B1 * | 9/2023 | Fujimoto | G06F 16/9558 705/304 |
| 2015/0310377 | A1 * | 10/2015 | Schlumberger | G06Q 10/063114 705/7.15 |

* cited by examiner

*Primary Examiner* — Amal S Zenati
(74) *Attorney, Agent, or Firm* — Plumsea Law Group, LLC

(57) ABSTRACT

Systems and methods for facilitating communication with a customer service representative by a provider system are disclosed. Specifically, the embodiments provide systems and methods that allow users to provide a user access to a provider system. The systems and methods store user tracking information describing interactions between the user and the provider system and receive a request from the user to interact with a customer service representative. The systems and methods obtain user session information and generate a connection phone number based on the user tracking information and the user session information. The systems and methods then initiate contact between the user and the customer service representative using the phone number.

20 Claims, 9 Drawing Sheets

MATCHED TELEPHONE ROUTING

CROSS-REFERENCE TO RELATED APPLICATION

This application claims the benefit of U.S. Provisional Patent Application Ser. No. 63/498,746 filed on Apr. 27, 2023 and titled "Matched Telephone Routing", the disclosure of which is incorporated by reference herein in its entirety.

TECHNICAL FIELD

The present disclosure generally relates to interactive voice response (IVR) systems and other structured online menu systems for a provider system, and in particular to making it easier for a user to interact with a customer service representative (CSR) when using an IVR system or another online system by tracking access to the structured online menu system.

BACKGROUND

Many businesses use websites, mobile applications (also referred to as mobile apps), other dedicated applications, and interactive voice response (IVR) systems as a way to interact with their customers. By using these platforms, it is possible to automatically handle many routine transactions automatically. When handling transactions, the users navigate through the platforms to reach a specialized part of the system that is designed to address their specific use case. For example, a user might use a website to apply for a credit card automatically online. As other examples, a user might use a mobile application to transfer money between investment accounts, or use an IVR system to automatically request the balance of a checking account. By using such automated systems, it may be possible for businesses to handle routine interactions more cheaply by reducing the need to pay human customer service representatives (CSRs).

However, there are still instances when the flexibility of a human CSR may be required. For example, an automated system may not be able to improvise to meet an individual user's questions enough to be sufficiently helpful. Alternatively, certain questions may raise security issues and it may be preferable to manage these issues by a human CSR. However, there may be difficulties in seamlessly transitioning between an automated system (such as a website, a mobile application, or an IVR system) and a human CSR.

In particular, it may be difficult to easily ascertain which human CSR would have the appropriate training to help a user with a particular issue. Providing such information efficiently may assist the human CSR in addressing the user's particular needs. Also, once the user is done with interacting with the human CSR, existing approaches do not provide optimal ways to help the user resume interaction with an automated system in a way that takes into account the interactions between the human CSR and the user. Additionally, existing approaches would benefit from an effective way to provide helpful information when establishing communication with a CSR. Existing approaches merely connect a user with a CSR, and the user is then left to interact successfully with the CSR. It would potentially be helpful to provide a way to automatically provide information about the user (such as the user's identity, particular needs, and previous interactions with the automated system). Such information could help the CSR better serve the user.

There is a need in the art for a system and method that addresses the shortcomings discussed above.

SUMMARY

In one aspect, a system for facilitating communication with a customer service representative includes at least one processor configured to provide a user with access to a provider system. The at least one processor is further configured to store user tracking information describing interactions between the user and the provider system. The at least one processor is also configured to receive a request from the user to interact with the customer service representative. The at least one processor is further configured to obtain user session information. The at least one processor is also configured to generate a connection phone number based on the user tracking information and the user session information. The at least one processor is further configured to initiate electronic contact between the user and the customer service representative using the connection phone number.

In another aspect, a method for automatically facilitating communication with a customer service representative includes providing a user with access to a provider system. The method further includes storing user tracking information describing interactions between the user and the provider system. The method also includes receiving a request from the user to interact with the customer service representative. The method further includes obtaining user session information. The method also includes generating a connection phone number based on the user tracking information and the user session information. The method further includes initiating electronic contact between the user and the customer service representative using the connection phone number. The method also includes providing information to the customer service representative to aid in assisting the user based on at least one of the user tracking information and the user session information.

In another aspect, a method for facilitating communication with a customer service representative by a provider system includes providing a user with access to a provider system. The method further includes storing user tracking information describing interactions between the user and the provider system. The method also includes receiving a request from the user to interact with the customer service representative. The method further includes generating a connection phone number based on a string of numbers corresponding to the user tracking information. The method also includes initiating electronic contact between the user and customer service representative using the connection phone number. The method further includes receiving an indication from the customer service representative that the electronic contact with the customer service representative is complete. The indication may include information describing the electronic contact. The method also includes restoring access to the provider system based on the information describing the electronic contact.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for using an interactive voice response (IVR) system and other online approaches to interface with a provider system, such as a financial system. Specifically, the embodiments provide systems and methods that allow users to seamlessly transition between an IVR system or another provider system and an affiliated customer service representative (CSR). Such an approach provides the advantage that the provider system may be automated to the extent possible. This approach saves on the need for human CSRs. However, it remains possible to easily get the assistance of such a human CSR when the provider system discerns that such assistance is needed.

Figure 1:
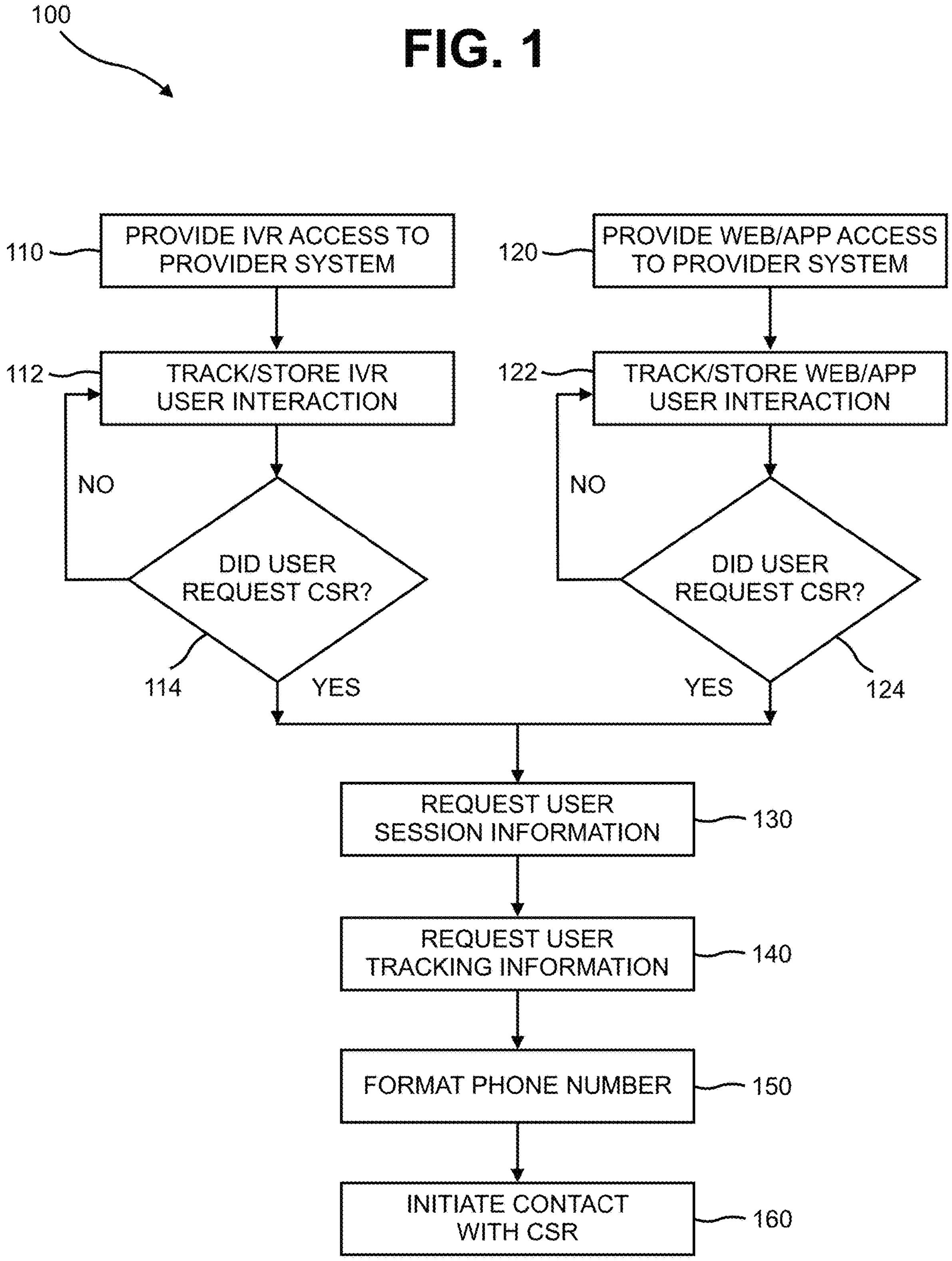
FIG. 1 is a flowchart of interacting with a provider system and requesting the assistance of a customer service representative (CSR), according to an embodiment.

FIG. 1 is a flowchart 100 of interacting with a provider system and requesting the assistance of a customer service representative (CSR), according to an embodiment. The method of FIG. 1 may begin with providing access to a provider system. The access may be provided in at least two ways. One way is to provide interactive voice response (IVR) access, as shown in step 110. In this case, the system interacts with a user over a telephone call. During the telephone call, the provider system prompts the user to make selections to navigate interaction with the provider system. For example, the user may make selections by speaking the selections or corresponding numbers, or by entering tones associated with numbers.

As the user interacts with the IVR system of the provider system, in step 112, the system tracks and stores IVR user interactions. For example, step 112 may involve allowing the user to provide voice input or entered tones that allow the user to interact with the IVR. As the user does so, the user's inputs are stored. By tracking the user's inputs, it becomes possible to establish a record of actions taken by the user. Such a record establishes where in the IVR hierarchy the user has navigated. The record also establishes what the history of the user's IVR interactions is. Once the system has tracked and stored a record of an IVR user interaction at step 112, the method proceeds to step 114. In step 114, the method of FIG. 1 determines if, in the IVR user interaction of step 112, the user has requested an opportunity to speak with a customer service representative (CSR).

For example, the user may feel that the options presented by the IVR system do not meet the user's needs or are confusing. In such a situation, the user may select an option to interact with a CSR. Such a CSR may be a human being. However, it is also possible to use an intelligent chatbot prior to using a human CSR, as the chatbot may be able to solve the user's needs without the need to pay a human being. However, the chatbot may forward the user to a human CSR quickly if it becomes clear that the user is becoming frustrated. For example, such frustration may be detected based on a tone quality or a loud volume of the user's voice, or by spoken words that indicate frustration. A given user may also have a preference that states whether that user is willing to initially work with an AI chatbot, or if the user should immediately be placed in contact with a human CSR.

The interaction with the CSR may be an electronic interaction. For example, the electronic interaction may be a voice-based interaction (such as a telephonic interaction), a video-based interaction, or a text-based interaction. Given that step 114 corresponds to an embodiment in which the user interacts with the provider system using a voice-based IVR interaction, it is likely that the user may wish to interact with the CSR by voice. However, it is also possible for the user to interact with the CSR by video or text, such as by using a videoconferencing application, a messaging application or a chat application. In step 114, if the user did not request a CSR, the method of FIG. 1 returns to step 112 to track and store further user interactions with the IVR. If the user did request a CSR, the method of FIG. 1 proceeds to step 130.

However, the user may also interact with the provider system in a related manner in step 120, step 122, and step 124. For example, in step 120 the system provides web-based or application-based access to a provider system. For example, the web-based access may allow a user to use a web browser to access a web site provided by the provider system. Such a web browser may be provided at a desktop or laptop PC, a tablet, or a smartphone. However, any electronic device capable of running a web browser may be used in step 120. Furthermore, the provider system may provide access using a dedicated application. For example, the dedicated application may be a mobile application run by a device such as a smart phone, a tablet, or a phablet. The dedicated application may also be an application run by a device such as a desktop or laptop PC or another similar computing device.

In step 122, in a manner similar to that of step 112, the system tracks and stores web-based or application-based user interaction. Thus, such tracking establishes which inputs a given user has chosen. Such information may be helpful when instructing a CSR how to help the user. The inputs establish the user's position in a hierarchy of options defined by the provider system. In step 124, the method determines whether the user requests an interaction with a CSR. For example, the user may select an option to interact with a CSR by interacting with a website or an application provided by the provider system. In step 124, if the user did not request a CSR, the method of FIG. 1 returns to step 122 to track and store further user interactions with the website or application. If the user did request a CSR, the method of FIG. 1 proceeds to step 130.

In FIG. 1, step 130 occurs after the method has established that the user would like to interact with a CSR. For example, in step 130, the method requests user session information. Such user session information may include an identifier of the user as well as credentials associating the user with an account. For example, the identifier of the user may be a username, an email address, or an identifying number. The credentials may include an account number or other information providing access to accounts or other access privileges to goods or services provided by the provider system. Additional aspects and examples of the user session information are discussed, below. There may also be user session information that serves as both an identifier as well as a credential. Such information may include a Social Security Number or a Driver's License Number.

In step 140, the method requests the user tracking information. For example, such information may include information about how the user interacted with the provider system prior to requesting the CSR. For example, the user tracking information may include a record of the inputs the provider system tracked and stored earlier in the method, such as at step 112 or 122. Once the system has the user session information from step 130 and the user tracking information from step 140, the system formats a phone number in step 150. Further details and examples of such formatting are presented in FIG. 5. Then, in step 160, the system initiates contact with a CSR. Further details of such initiating are presented in FIG. 6.

Some embodiments may include provisions for using a provider system to provide access to accounts. In some embodiments, the accounts may be preexisting accounts. The user may supply credentials to establish access privileges. In some cases, the accounts may be new accounts. A CSR may help with setting up new accounts. In some embodiments, the accounts may be financial accounts. In some cases, the financial accounts may include banking accounts. In some embodiments, the banking accounts may include checking accounts, savings accounts, or credit card accounts. However, the banking accounts are not limited to these examples, and the banking account may include other forms of banking accounts.

In some cases, the financial accounts may include investment accounts. In some embodiments, the investment accounts may include stock accounts. In some cases, the investment accounts may include bond accounts. In some embodiments, the investment accounts may include mutual fund accounts. However, the investment accounts are not limited to these examples, and the investment accounts may include other forms of investment accounts.

In some embodiments, the provider system allows a user to access information about the accounts. In some cases, the information may include account numbers or other account identifiers. In some cases, the information may include information such as balances, transaction histories, asset allocations, interest rates, asset parameters, rewards programs, investment characteristics, and so on.

In some cases, the provider system may allow a user to conduct transactions for the accounts. In some embodiments, the transactions may be banking transactions. In some cases, the banking transactions may include electronic fund transfers, account reallocations, balance transfers, or cash withdrawals. In some embodiments, the transactions may be investment transactions. In some cases, the investments may include purchases, sales, reallocations, or transfers of investment assets.

In some embodiments, the accounts may be e-commerce accounts. In some cases, the accounts may be service accounts. In some embodiments, the service accounts may be insurance accounts. However, these are only examples. It is to be realized that any provider system associated with a hierarchy of options where the assistance of a CSR is sometimes needed may be used in association with the disclosed methods and systems disclosed herein. For these accounts, the user may still wish to obtain information about and account or conduct a transaction.

Thus, the provider system may allow a user various forms of access to accounts at the provider system. Some embodiments may include provisions for allowing access to the provider system using a device. In some embodiments, the interaction may occur using an IVR system. In some cases, the IVR may use a telephone connection or another audio connection. In such a telephone connection or audio connection, an automated system may provide audio narration with prompts. Such prompting allows the user to interact with the IVR system.

In some embodiments, the audio narration may include pre-recorded human speech. In some cases, the audio narration may include synthesized speech. Such synthesized speech may be generated using a text-to-speech engine. In some embodiments, the IVR system may interact with the user over a telephone call on the Public Switched Telephone Network (PSTN). In some cases, the IVR system may interact with the user over a telephone call using Voice over Internet Protocol (VoIP). In some embodiments, the IVR system may interact with the user using a cellular phone. Such a cellular phone may use various cellular technologies, such as 3G, 4G Long-Term Evolution (4G LTE), and 5G New Radio (5G NR) technologies, as non-limiting examples. In some cases, the IVR system may interact with the user using a cordless phone or a corded phone.

As the IVR system interacts with the user, the user may provide inputs to the IVR system. For example, the user may interact with the user by entering numeric tones, such as dual-tone multiple frequency (DTMF) codes. The user may also utter numerals or use natural language to interact with the IVR system. In some cases, the user may interact with the provider system by using a computerized interface. In some cases, the computerized interface may include accessing the provider system using a website on the World Wide Web.

In some cases, the computerized interface may include a dedicated application for accessing the provider system. In some embodiments, the dedicated application may be an executable application executed at desktop or laptop computer. In some cases, the dedicated application may be a mobile application executed at a smartphone or a tablet computer. Whether accessed through an IVR interface or through a computerized interface, the provider system may have a hierarchical tree structure, such as those presented in FIG. 4. Such a hierarchical tree structure facilitates seamlessly accessing an appropriate customer service representative (CSR).

In some embodiments, the provider system may be able to connect a user with a CSR. The CSR may then help the user with the process of accessing the user's accounts. In some cases, the CSR may be selected based on the user's goal. The user's goal may be information, such as an answer the user seeks. Alternatively, the goal may be a transaction or another action the user wishes to carry out.

In some embodiments, the CSR may be chosen based on aspects of a user's identity. For example, demographics of the user may help determine which CSR might be preferable. Example demographics could include age, gender, race, and so on. In some cases, the CSR may be chosen based on aspects of a user's accounts. For example, a user who needs help applying for a credit card might prefer to work with a CSR specializing in this task. In some embodiments, the CSR may be selected based on tracking a user's interaction with an automated system.

Thus, in some cases, the provider system may determine an aspect of the system and chooses a CSR that matches user preferences or is a specialist in an appropriate topic. In some embodiments, the provider system may provide information about a user that may help the provider system better serve the user. The information could include identifying information for the user, account information for the user, user profile information, and access history information for the user.

Figure 2:
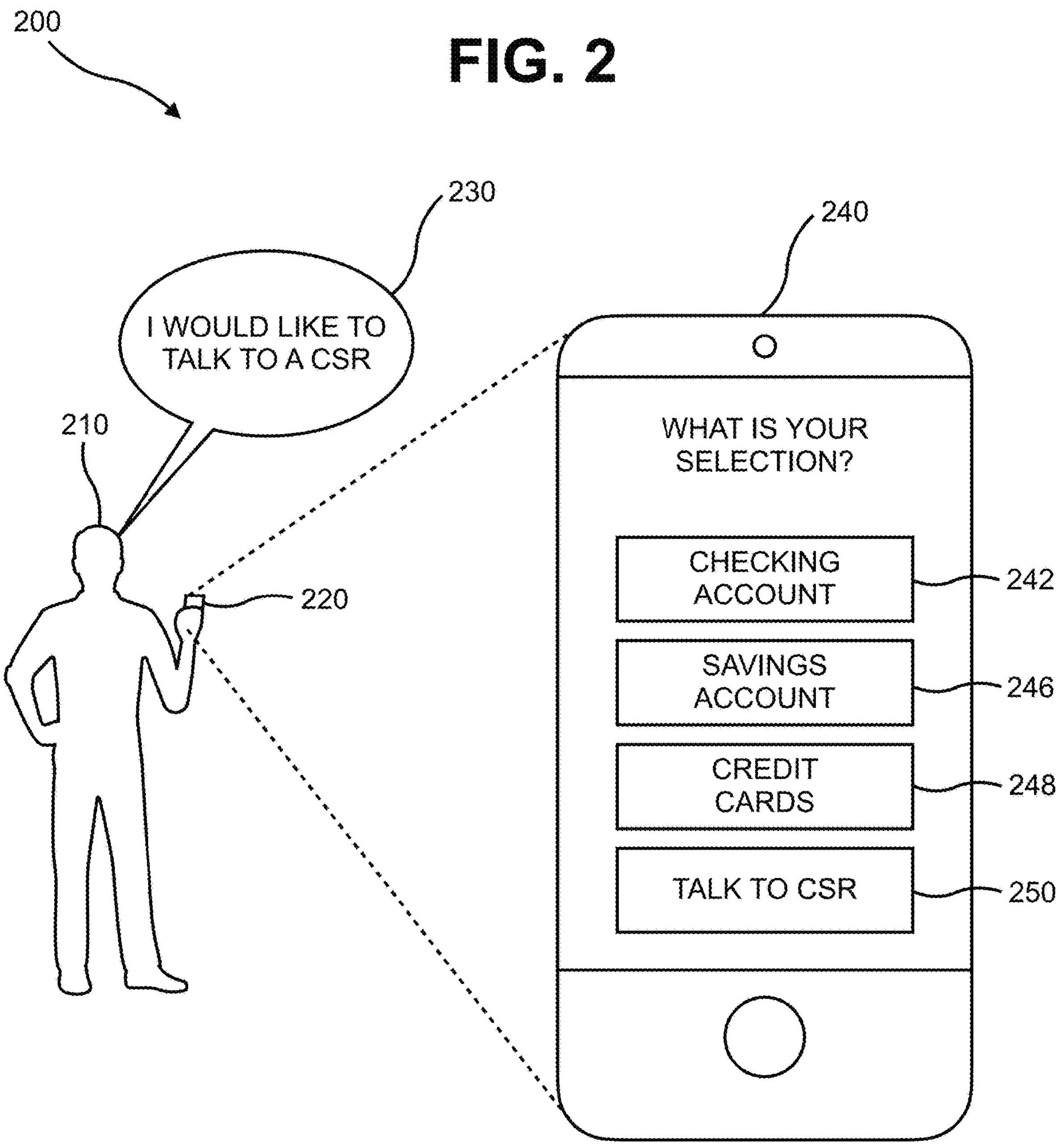
FIG. 2 is a schematic view of a user interacting with a provider system and being provided with an option to interact with a customer service representative (CSR), according to an embodiment.

FIG. 2 is a schematic view 200 of a user 210 interacting with a provider system and being provided with an option to interact with a customer service representative (CSR), according to an embodiment. For example, user 210 may interact with a provider system using a mobile device 220. Mobile device 220 is shown in FIG. 2 as being a smartphone. However, other devices such as a phablet or a tablet, as non-limiting examples, may also be used to allow the user 210 to interact with the provider system.

In FIG. 2, display 240 is associated with mobile device 220. Display 240 shows a number of actions that the user 210 may take. For example, display 240 may prompt the user, "WHAT IS YOUR SELECTION?" Display 240 may also presents a number of navigation options to the user 210. These navigation options allow the user 210 to interact with the provider system. For example, the user 210 may want information about a checking account 242, a savings account 244, or about credit cards 246. There may also be an option 248 that allows a user 210 to request a chance to talk with a CSR.

FIG. 2 shows display 240 of mobile device 220 as a way to present the options for user selection. For example, the display 240 may be a touchscreen display. The user may select a desired option by touching a portion of the display corresponding to the desired choice. However, the user may also interact with the provider system by using a web browser to interact with a web site provided by the provider system. For example, such a web browser may be used by a desktop personal computer (PC), a laptop PC, a tablet, and so on. For example, in the web browser, the user could select an option using an interactive device such as a mouse, trackpad, trackball, trackpoint, or keyboard.

Alternatively, the user 210 may interact with the provider system using an IVR interface. For example, the provider system may recite options to the user 210 using an audio-based connection. The provider system may also associate numbers with IVR options. For example, the provider system may recite, "WHAT IS YOUR SELECTION? 1) CHECKING ACCOUNT 2) SAVINGS ACCOUNT 3) CREDIT CARDS 4) TALK TO CSR."

The user 210 may select an option in one of at least three ways. First, the user 210 may recite the option they would like to select, and the system may recognize the selected option using voice recognition. For example, user 210 may say "SAVINGS ACCOUNT." The user 210 may continue interacting with the savings account portion of the provider system, accordingly. Second, the user 210 may say a number associated with his or her choice. For example, the user 210 may say "THREE." In response, the user may be directed to credit cards. Third, the user 210 may push a numerical key on his or her phone to select one of the options.

However, if the user 210 does not select a choice in one of these manners, it may be assumed that the user would like to speak with a human CSR. For example, the user 210 may say "I WOULD LIKE TO TALK TO A CSR" at 230. The provider system recognizes this speech and acknowledges that it should connect the user 210 to an appropriate CSR. Further details of connecting the user 210 to an appropriate CSR are presented below. Alternatively, the user 210 may have a pre-existing preference to work with a CSR, whether immediately, or only from a certain place in the hierarchy. For example, the system may know that the user 210 can use the automated system for checking account 242 or savings account 246 queries, but may require a CSR for issues involving credit cards 248.

Figure 3:
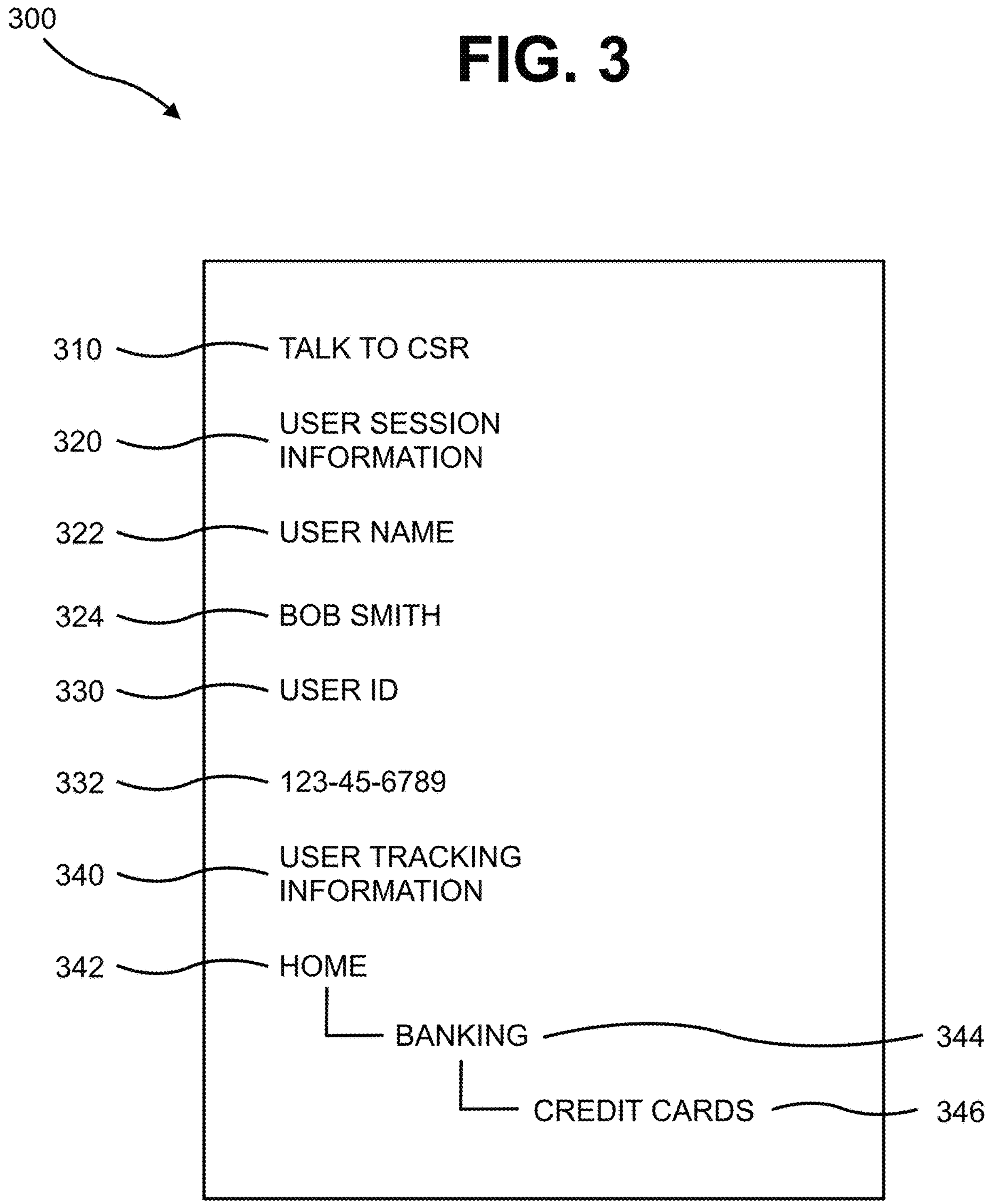
FIG. 3 is a schematic view of information provided to the customer service representative (CSR), according to an embodiment.

FIG. 3 is a schematic view 300 of information provided to the customer service representative (CSR), according to an embodiment. For example, FIG. 3 shows a screen of a device that may illustrate a display indicating that the user of the device wishes to talk to a CSR 310. For example, FIG. 3 shows that the system has access to user session information 320. The user session information 320 may include a username 322 and a user ID 330. For example, the username 322 may be the user's actual name 324. However, this is only an example of the username 322, and other identifiers may be used as the username to identify the user, such as an email address. Other alphanumeric strings may be used as usernames in other examples.

The user session information 320 may also include a user ID 330. For example, FIG. 3 illustrates that the user ID 330 may be a Social Security number 332 of the user. For example, the user may be Bob Smith with a Social Security number 332 "123-45-6789." It may be recognized that other identifying information may be used as the user ID 330. For example, the user ID 330 could include another government-issued identifier such as a driver's license number, or another assigned user ID. If a user does not have a numerical user ID 330, the system may transform the user session information 320 into a number for use in connecting the user to a CSR. In addition to the user session information 320, the system may track user tracking information 340.

Such user tracking information 340 establishes where the user is in the hierarchy of the provider site. For example, the user tracking information 340 may show that the user began at home 342, navigated to banking 344, and then navigated to credit cards 346 within banking. The user tracking information 340 may help the system maintain its position in the provider system.

By using the user tracking information 340, the system is able to seamlessly transition back and forth between the provider system and the CSR. Specifically, the system begins by accessing the provider system by using a website or an application or accessing the provider system by using an IVR interface. The provider system allows for interaction with a CSR. Once the CSR interaction is over, the provider system can resume where it left off. The provider system resumes operation from the same position in the hierarchy from which it originally left.

Figure 4:
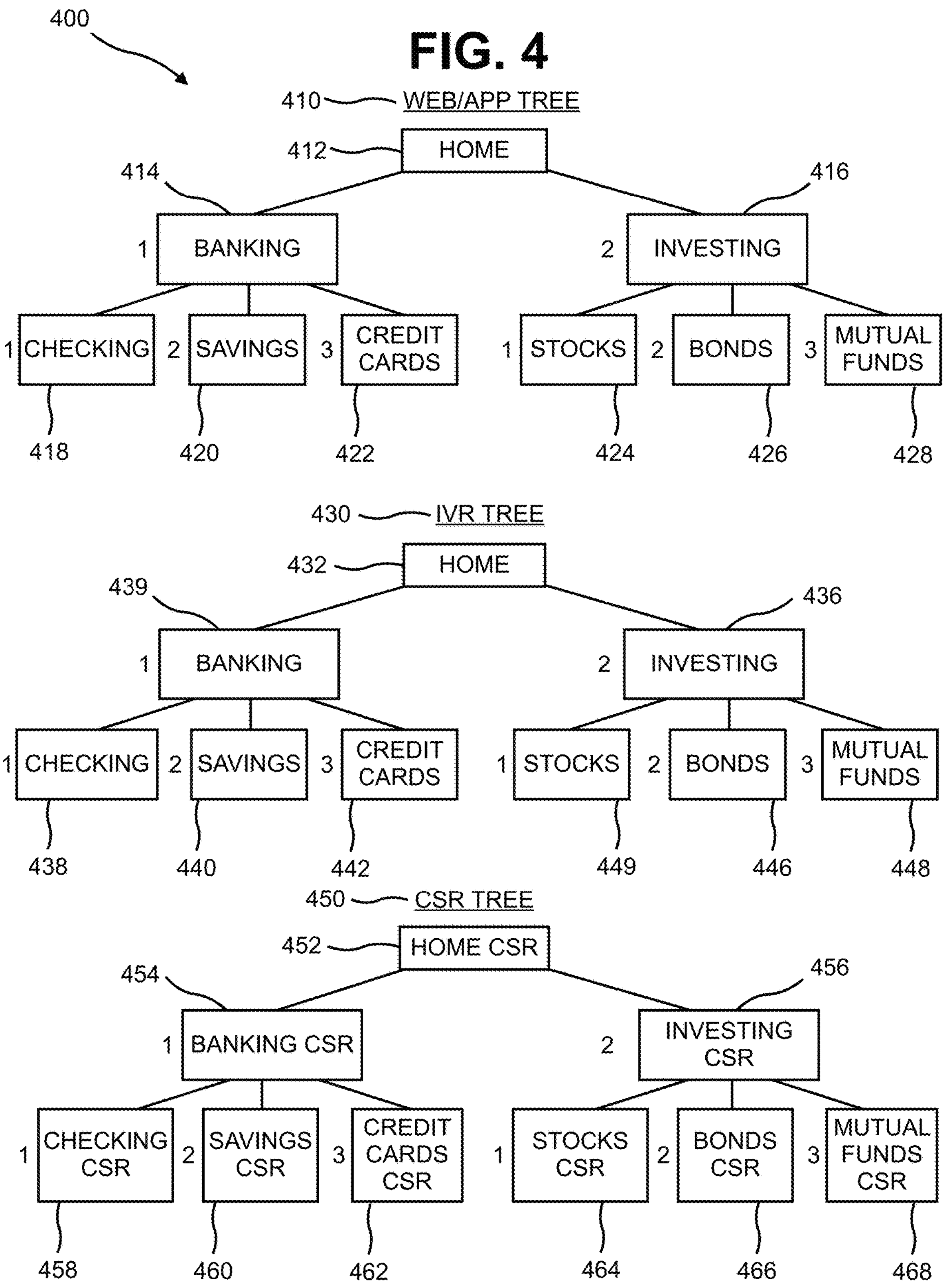
FIG. 4 is a schematic view of trees depicting ways of interacting with a provider system, according to an embodiment.

FIG. 4 is a schematic view 400 of trees depicting ways of interacting with a provider system, according to an embodiment. These trees are examples of the parallel organization of the provider system across multiple interface paradigms. For example, there may be a web/app tree 410, an IVR tree 430, and a CSR tree 450. Each of these illustrates the organization of a corresponding way of interacting with an example provider system. The web/app tree 410 shows a hierarchy underlying the web or application access to the provider system. For example, the web/app tree 410 has, at the top of the hierarchy, a home node 412. Such a home node 412 may correspond to a landing page of a website, or may be an initial screen that is provided when the user initially accesses a dedicated application such as a mobile application.

The home screen providers the user with a choice between banking 414 and investing 416. By making such a choice the user is able to navigate through the website or application to a interact with a portion of the provider system that is more specific to his or her needs. Banking 414 provides a choice between checking 418, savings 420, and credit cards 422. Thus, a user is able to choose a subtopic related to a particular aspect of banking 414. Since tree 410 is a web/app tree 410, the user may make his or her selection by interacting with the web page (such as by keyboard input or a mouse click on a hyperlink or button), input to a dedicated application, or by using a touchscreen on a mobile application executed by a mobile device to interact with the website or application and navigate through the web/app tree 410. Similarly, the user may select an option relating to investing 416. Once the user has selected investing 416, the user may select from stocks 424, bonds 426, and mutual funds 428.

The options in the tree are each associated with numbers that record a path a user takes through the tree as he or she interacts with the provider system. For example, banking 414 may be associated with the number "1" and investing 416 may be associated with the number "2." Beneath each of these options, the sub-options are also associated with appropriate numbers. Checking 418 is associated with "1," savings 420 is associated with "2," and credit cards 422 is associated with "3." Similarly, under investing 416, stocks 424 is associated with "1," bonds 426 is associated with "2," and mutual funds 428 is associated with "3." Thus, these numbers can specify a path through the tree. For example, "1-2" would represent savings 422, and "2-3" would represent mutual funds 428.

A similar tree is presented as an IVR tree 430. For example, the IVR tree includes a home node 432, which allows the user to select banking 434 which is associated with "1" or select investing 436 which is associated with "2." If the user selects banking 434, he or she may select checking 438 which is associated with "1," savings 440 which is associated with "2," or credit cards 442 which is associated with "3." Likewise, If the user selects banking 434, he or she may select checking 438 which is associated with "1," savings 440 which is associated with "2," or credit cards 442 which is associated with "3."

A similar tree is presented as a CSR tree 450. For example, the CSR tree includes a home CSR node 452, which allows the user to select banking 454 which is associated with "1" or select investing 456 which is associated with "2." If the user selects banking 454, he or she may select checking 458 which is associated with "1," savings 460 which is associated with "2," or credit cards 462 which is associated with "3." Likewise, If the user selects banking 454, he or she may select checking 458 which is associated with "1," savings 460 which is associated with "2," or credit cards 462 which is associated with "3."

Figure 5:
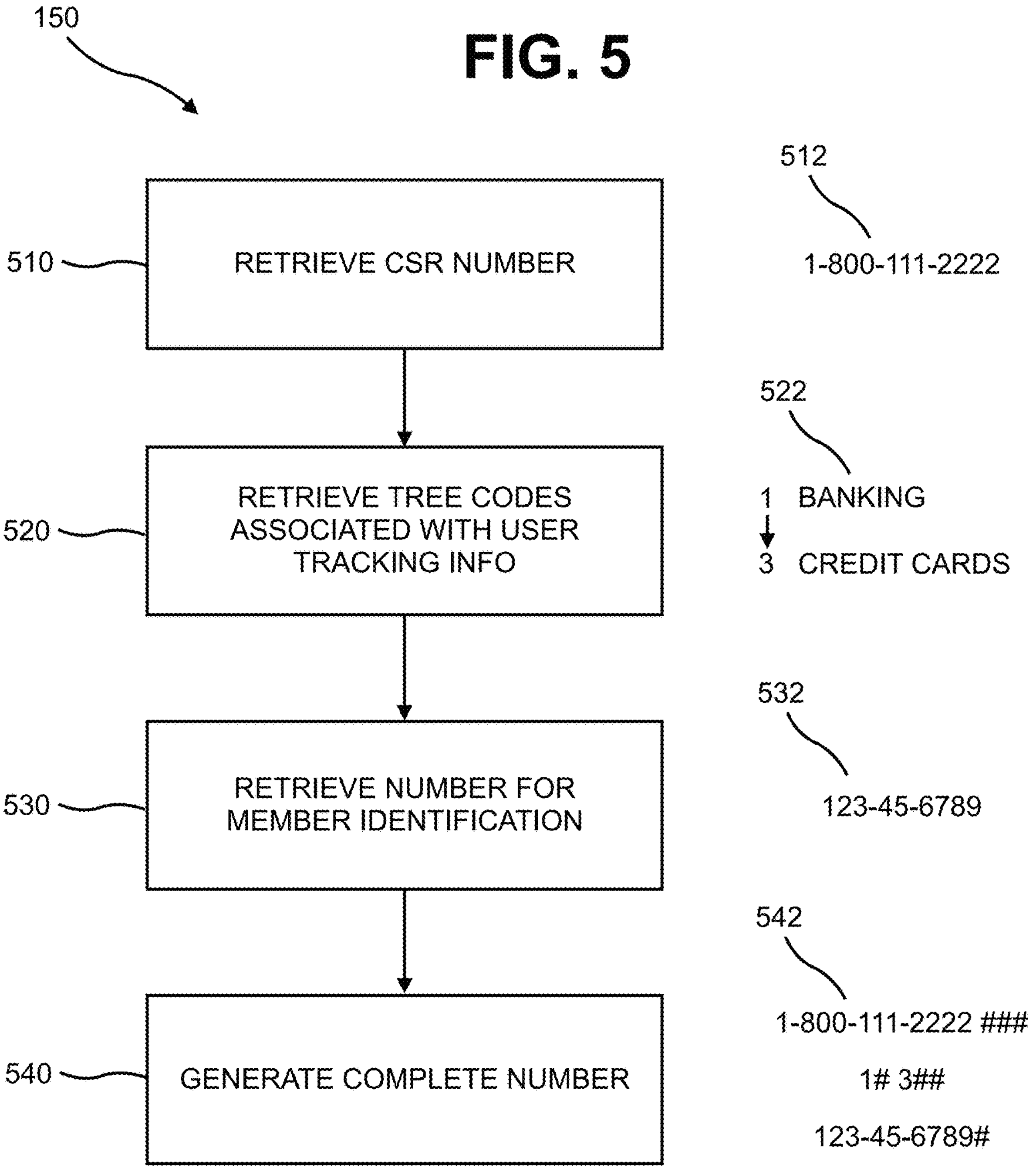
FIG. 5 is a schematic view of constructing a telephone number to use when contacting a customer service representative (CSR), according to an embodiment.

FIG. 5 is a schematic view 150 of constructing a telephone number to use when contacting a customer service representative (CSR), according to an embodiment. In step 510, the method retrieves a CSR contact number. Such a number may be a dedicated number that is designated to connect a user to a CSR when the user requests interaction with the CSR. For example, FIG. 5 shows that the CSR contact number may be "1-800-111-2222" as an example number 512. Such an example number 512 follows U.S. dialing conventions, but it may be recognized that other formats may be used for the CSR contact number in other countries.

Additionally, the example CSR contact number 512 "1-800-111-2222" includes a dialing prefix of "800" which makes it a toll-free number. Using a toll-free number may help connect the user with a CSR without requiring them to pay long-distance tolls. However, the CSR contact number is not limited to a toll-free number given that many users have unlimited long distance calling. Additionally, there may be a number of CSR contact numbers, such that if one CSR contact number is busy another CSR contact number is used as a substitute number.

In step 520, the method retrieves tree codes associated with user tracking information. For example, these tree codes may be based on where a user is in the interaction with a tree shown in FIG. 4, such as web/app tree 410 or IVR tree 430. For example, an example code 522 may be "1-3" if the user initially selected banking, which is associated with the code "1" and credit cards, which is associated with the code "3."

For example, the user may have selected these options in succession on an application or a website. Alternatively, the user may have selected these options through voice interaction with an IVR system. However, the code "1-3" specifies that the proper place in the provider system hierarchy. Thus, the code allows the system to identify the proper CSR. Accordingly, the code allows the system to connect the user directly to the credit cards CSR 462. Such a credit cards CSR 462 may have specialized training in answering questions related to credit cards.

In step 530, the method retrieves a number for a member ID 532. Such a member ID 532 may be a string of digits that may, ideally, identify the user and also specify an account with which the user is affiliated. For example, the member ID 532 may be the user's Social Security Number, such as "123-45-6789." In some cases, the number itself identifies the user and an account of the user. However, in other cases, the member ID 532 may include identifying information and account information. While step 530 is characterized as retrieving numbers, a variant is possible in which step 530 retrieves tones in lieu of numbers to identify the user.

In addition, the member ID 532 may be based on transforming a username and a credential into a numerical string. For example, if the user name is "Bob Smith" and the user is associated with account number "1B222C333" the information could be transformed, such as using a conversion function to associate a numerical value with the information. For example, the example user name and account number may be transformed into the numerical string "123456789987654321" and this numerical string may identify, to the provider system, the user's identity. The numerical string may also indicate an account associated with the user, as well provide a credential associated with that account. For example, the string may include information related to identifying a checking account number (and possibly a related routing number) to specify a checking account and may include a credential allowing access to that checking account.

In step 540, the method assembles the various pieces of information and generates a complete number to contact an appropriate CSR. For example, the method may combine the results of steps 510, 520, and 530. The method may introduce "#" symbols between the relevant numbers. For example, a complete number 542 generated by step 540 is illustrated in FIG. 5. For example, the complete number 542 could be "1-800-111-2222-###-1-#-3-##-123-45-6789#." Such a complete number is a combination of the CSR contact number 512, the code 522, and the user ID 532. Additionally, there are "#" symbols introduced between each of these items to provide delays. While FIG. 5 shows a particular ordering, another ordering is possible, and additional, different, or more limited information may be used. Thus, the system connects the user to a CSR by dialing the CSR contact number 512, waits a sufficient amount of time to make the connection, provides a code 522 to connect the user with an appropriate CSR in the hierarchy, and provides a user ID 532 to indicate the identity of the user.

The user ID 532 may also specify which account the user needs help with, as well as provide credentials that confirm that a given user is entitled to access that account. Thus, dialing the complete number 542 presented in FIG. 5 as an example, may connect the user to the main CSR call center, may specify that the user needs help from a CSR who specializes in credit cards (option 3) as a subset of banking (option 1), and may provide the Social Security number of the user to facilitate allowing the relevant CSR to figure out who the user is, which accounts are associate with the user, and which access privileges the user should have for those accounts.

Some embodiments may include provisions for generating a series of numbers that can provide the information needed to connect a user to a CSR. In some embodiments, such a connection may occur when a user requests contact with human CSR, in that the human being has decided that the human user wants help. In some cases, the connect may occur in response to a detection that a user wants help, even though the user has not articulated this. In some embodiments, if a user is detected as having a frustrated tone of voice, repeatedly presses a button (showing frustration), or is known to have a history of frustration, the system may automatically connect the user to a CSR.

In some embodiments, the generated number may include information about a user's position on the provider system hierarchy. In some cases, each number represents a path through the hierarchy. In some embodiments, the numbers are separated by a pound (#) symbol. In some cases, the numbers specifying a path fall within a certain range (such as 1 through 9). In some embodiments, the generated number may include information about a user's identity and relationship with the provider system. In some cases, the generated number identifies the user and includes information that allows the provider system to determine what accounts are associated with the user and what access privileges the user should have.

In some embodiments, the numbers includes different numbers of separator codes between the different pieces of information. In some cases, the numbers include separator codes that are actual numbers or tones, such as a 0, a pound (#) or a star (*), or the separator codes may include a pause of a set duration. In some embodiments, instead of sending separator codes, the system may send a piece of information, and may wait to receive some sort of acknowledgment before sending the next piece of information.

Figure 6:
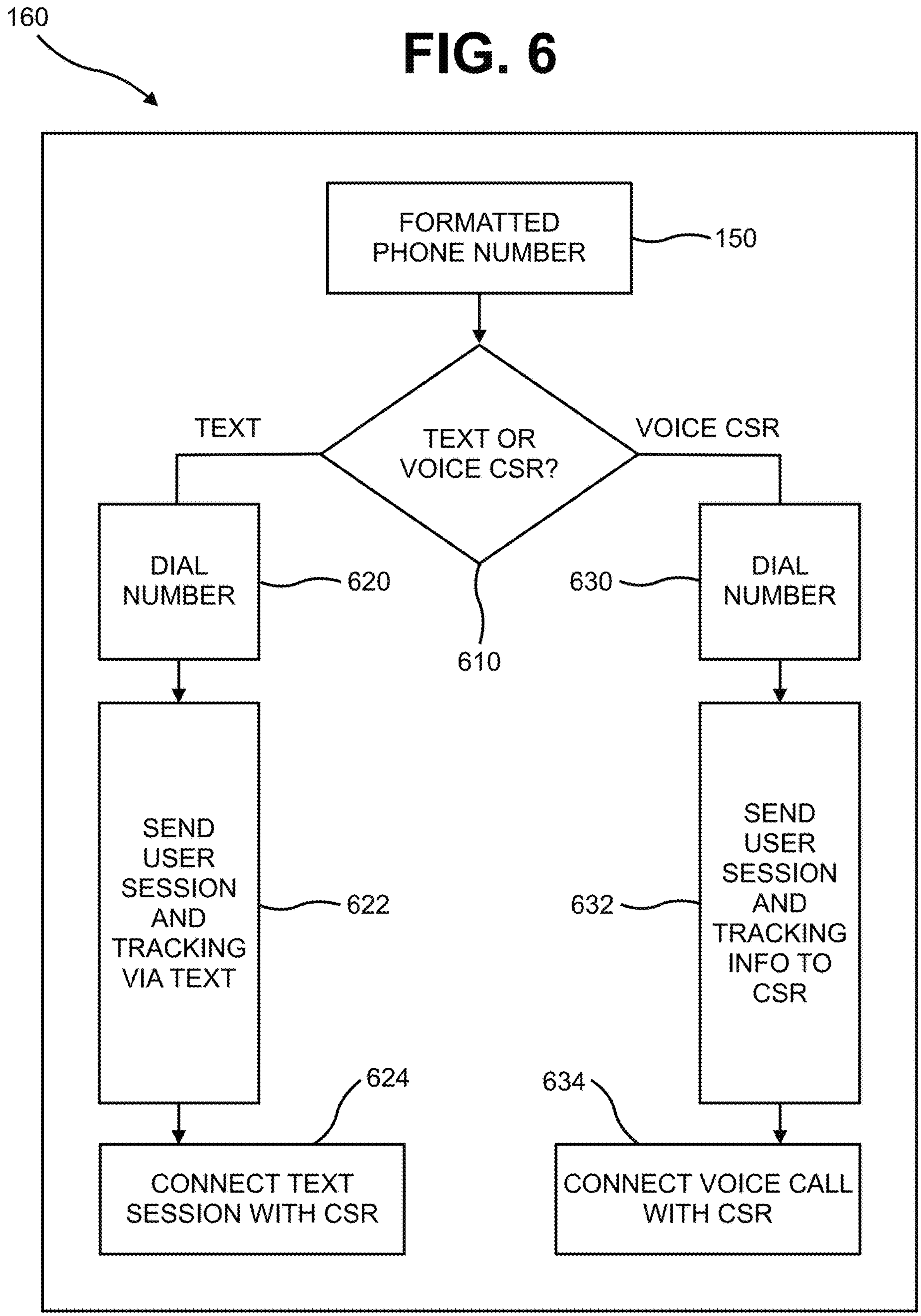
FIG. 6 is a schematic view of connecting a user to a customer service representative (CSR) by text or voice communication, according to an embodiment.

FIG. 6 is a schematic view 160 of connecting a user to a customer service representative (CSR) by text or voice communication, according to an embodiment. FIG. 6 corresponds to step 160 in FIG. 1. For example, FIG. 6 begins by receiving the formatted phone number produced as a result of step 150 of FIG. 1, a process which is shown in greater detail in FIG. 5. Initially, FIG. 6 determines in step 610 whether communication between the user and the CSR is to occur via text or voice. For example, a text interaction may allow the user to communicate with the CSR using text messages such as Short Message Service (SMS) messages, a chat application, or a chat window in a web browser.

A voice interaction may occur over a telephone connection, such as using the Public Switched Telephone Network (PSTN). Alternatively, the telephone connection may use a Voice over Internet Protocol (VoIP) connection. Another option for interaction between the user and the CSR is a videoconferencing application. Such an application may provide for an interaction between the user and the CSR. Such a voice interaction may include video and audio interaction, or just an audio interaction.

Some embodiments may include provisions for connecting a user to a CSR. In some embodiments, a user who was previously accessing a provider system using an IVR interface is connected to the CSR. In some cases, the system sends connection information to connect the user to the CSR. In some embodiments, the system may send the connection information using a text message, such as a short message service (SMS) message. In some cases, the connection information may be sent as a string of digits. In some embodiments, the string of digits is based on user tracking information and/or user session information. In some cases, the system may send an SMS message that includes non-numeric codes, that represents an encoded version of the information that would otherwise be sent.

In some cases, the connection information is sent as a series of dual-tone multi frequency (DTMF) tones, where each tone has a pitch corresponding to the numbers in the information. In some embodiments, the system sends various types of session information for the use of the CSR when serving the user. In some cases, the system may send session information that specifies a user's identity. In some embodiments, the system may send a user's name, a government issued ID number (such as a Social Security number or a Driver's License Number), or an ID number issued by the provider system. In some cases, the system may send session information that specifies a user's accounts. In some embodiments, the system may send user information that defines a user.

In some cases, the user information may include account information. In some embodiments, the account information may include account numbers and credentials establishing access privileges for the accounts. For example, a certain user may be allowed to check a balance for a given account or add funds, but not withdraw funds from the account. In some embodiments, the user information may include In some cases, the system may store user preference information that defines certain aspects of how the user would like to interact with the provider system.

In some cases, the user information may include user history or user profile information that may help guide the CSR when interacting with the user. In some embodiments, the system may send user tracking information. In some cases, the user tracking information establishes where the user is in a hierarchy. Examples of such a hierarchy are shown in FIG. 4. In some cases, the hierarchy is represented by a series of numbers with delays between them. In some embodiments, the hierarchy is encoded into another numerical string representing the hierarchy.

If step 610 determines that the interaction is text-based, the method of FIG. 6 continues to step 620. In step 620, the method dials the phone number. While step 620 is referred to as dialing a phone number, step 620 refers to any means of connecting to a CSR using a connection. For example, since step 620 refers to a text connection with the CSR, rather than actually dialing a phone number, step 620 may simply identify a connection phone number (or another connection identifier) that can allow the method to connect the user with the CSR. For example, the CSR may be associated with a phone number that allows the CSR to send text messages to and from the CSR when interacting with the CSR.

Once step 620 has placed the user in contact with the CSR, the method sends the user session and tracking information to the CSR via text in step 622. By sending the user session information, the method provides information that identifies the user. The user session information may also provide information about at least one account associated with the user. The user tracking information provides the information necessary to connect the user to the appropriate CSR.

The user tracking information also provides the information necessary to identify information to provide to the CSR about how to handle a given user, given the user's previous interactions with the system. For example, the user tracking information may help guide the user to a CSR that can help the user with a question about a credit card account. Moreover, it may be necessary to have a human CSR. Having a human CSR may be necessary to protect both the financial institution and the user. For example, a user may have a locked credit card because there was fraud detected, or the user may have tried to log in too many times. Once the method sends the information in step 622, the method connects the user for a text session with the CSR in step 624.

If step 610 determines that the interaction is voice-based, the method of FIG. 6 continues to step 630. The approach followed thereafter is somewhat similar to that followed for a text-based CSR interaction. In step 630, the method dials a number to connect the user to a CSR using a voice connection. For example, in step 630 the method connects the user to a call center associated with multiple CSRs, each trained to help users with specific needs and requirements. As in step 622, in step 632 the method sends user session and tracking information to a CSR.

However, this information is potentially sent in a different way. While in step 622, this connection information is sent via text messages, in step 632, the information may generally be encoded and sent as tones (such as dual tone multi-frequency (DTMF) tones). Such encoding is shown in FIG. 5, by way of example. The information can be used to ensure that the user is connected to the correct CSR. Thus, in step 634, the method connects the voice call with the CSR.

Some embodiments may include provisions for providing a CSR to interact with a user. In some cases, the user may have previously interacted with the provider system using an IVR interface. In some embodiments, the user may have previously interacted with the provider system using a web interface. In some cases, the user may have previously interacted with the provider system using a dedicated application such as a mobile application. In some embodiments, the provider system provides information to the CSR to facilitate the interaction. In some cases, the information is provided as digits over a telephone connection. In some embodiments, the information is provided as digits over a text message service, such as a short message service (SMS) connection.

In some embodiments, the information provided includes identifying information for the user. In some cases, the identifying information includes information of use to the CSR. In some embodiments, the identifying information includes identifying information that specifies user parameters to help the CSR be of use to the user. In some cases, the information may indicate what sort of help the user is likely to need, such as answering questions or help with completing a transaction. In some embodiments, the information may include personality traits of the user, a history of interactions with the user, and information about an importance of the user, or if the user may have special needs that the CSR can help address.

In some cases, there may be information with respect to traits of the CSR. In some embodiments, this information may include information about how a CSR should be trained. For example, if a CSR is to assist a user who is having trouble accessing an account, it may be helpful for that CSR to be trained in a procedure for resetting a password. In some cases, the CSR should be selected based on experience. For example, if a CSR is needed to help reallocate investments in an investment portfolio, it would be helpful if the CSR has experience in equities trading.

In some embodiments, the CSR may able to certain things, but not others. In some cases, the CSR is only able to do certain things based on the privileges of the user. In some embodiments, a CSR is only able to give the user information. In some cases, the information may be limited based on the identity of the user. In some embodiments, the CSR may be allowed to do other things, such as carry out a transaction, reset an account, and so on. In some cases, the CSR may be limited in what the CSR can do based on the nature of the CSR. A junior CSR may be able to handle routine or low-security issues (such as a balance inquiry) but if a user wishes to handle a more sensitive issue (such as liquidating an account) it may be necessary to involve a more senior CSR.

Figure 7:
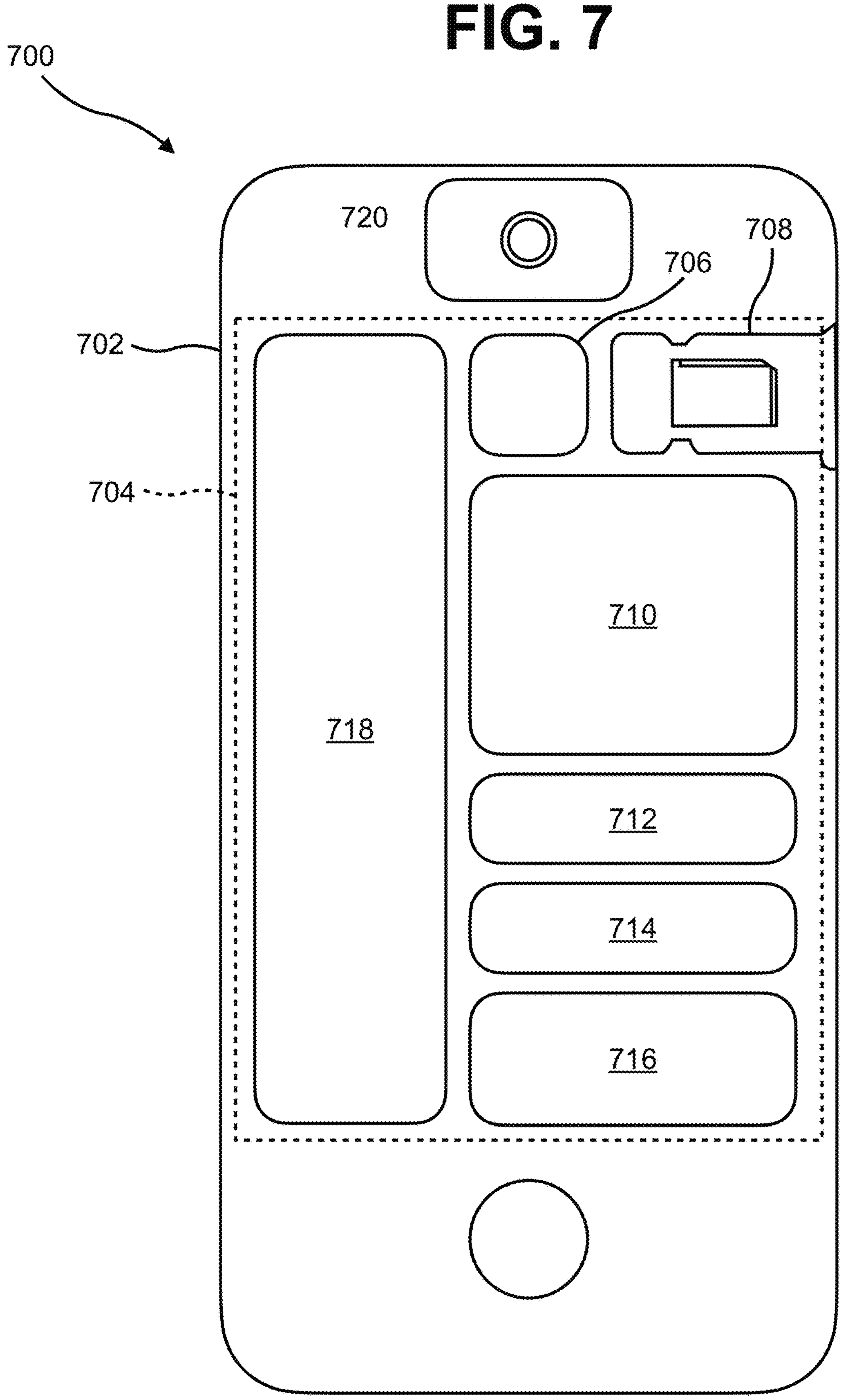
FIG. 7 is a schematic view of a smartphone that may be able to interact with a provider system or a customer service representative (CSR), according to an embodiment.

FIG. 7 is a schematic view 700 of a smartphone that may be able to interact with a provider system or a customer service representative (CSR), according to an embodiment. FIG. 7 is a schematic diagram 700 of a mobile device 702 showing components that may be used in the interaction with a CSR in an embodiment. Mobile device 702 includes a display 704. Display 704 may display a visual interface for a provider system to a user of mobile device 702 when such a mobile device 702 interacts with a provider system. The interface may include an interaction with a website through a web browser or an interaction with a provider system through a dedicated application such as a mobile application.

Display 704 also acts as a user interface that a user of mobile device 702 may use to provide inputs and selections when interacting with the provider system. In some embodiments, mobile device 702 can report information from a provider system to a user that given desired information about the user's interaction with the provider system, such as information about a financial account associated with the user at the provider team.

Mobile device 702 additionally includes a GPS unit 706. Data obtained from this GPS unit allows mobile device 702 to report its location to onboard and network databases. Such a location provides that user interaction may be determined based on the location of the user. For example, the interaction by the user using the mobile device 702 may be tailored to the user's location. Also, mobile device 702 may report the location of the user as a security measure. Mobile device 702 may also include a subscriber identity module (SIM) 708. In some embodiments, SIM 708 may serve to associate mobile device 702 with a user account, either for a particular interaction or as a more permanent association.

Mobile device 702 may also include a processing unit 710 that acts as a control module for the components of mobile device 702, including display 704 and camera 720. In those embodiments in which mobile device 706 includes the hardware for connecting with a CSR itself, processing unit 710 may also include the CSR contact module. In other embodiments, processing unit 710 merely acts a control module for a separate CSR contact module present on mobile device 702 or in some other device within the system. In other embodiments, the CSR contact module is remote, and mobile device 702 displays message and other communicated information received from the CSR contact module. In such embodiments, processing unit 710 in mobile device 702 may receive communications from the CSR contact module so that mobile device 702 may be able to coordinate an audio or text-based interaction with a CSR of a provider system whenever it is determined that the user would like to continue with the CSR.

Mobile device 702 may also include a connection module 716. Connection module 716 is associated with wired connections to mobile device 702. For example, the wired connections may be used for charging mobile device 702 or for making a wired connection between mobile device 702 and another device. In some embodiments, a wired connection between mobile device 702 and other portions of the system may be used to connect the mobile device 702 with a CSR, such as by using the Public Switched Telephone Network (PSTN) or Voice Over Internet Protocol (VoIP). Alternatively, the contact with the CSR may involve a text-based chat or a video-based interaction.

In some embodiments, connection module 716 serves as a communications path for sharing information installed on mobile device 702 with the CSR, such as account information or customer preferences. By sharing such information, when the CSR interacts with the user, the CSR immediately knows what type of assistance the user needs. The CSR can also easily access information that may help the CSR easily and effectively help the user.

Mobile device 702 further includes a memory 714. In some embodiments, memory 714 stores information about users and their accounts. Memory may also store images of the user generated by camera 720 before the images are processed to confirm user identity. The camera 720 also acts as a video source in embodiments where the user interacts with the CSR over video. In some embodiments, memory 714 may also serve as local storage for managing information about users, users' credentials, users' accounts, and the interaction history of the users.

Mobile device 702 may also include a communication module 712. Communication module 712 is associated with wireless communications (such as WiFi, Bluetooth, near field communication (NFC) technologies, and 3G, 4G or 5G for transmissions over the Internet) and other devices, servers, and databases either local to the vehicle associated with mobile device 702 or remote to the vehicle. In some embodiments, communication module 712 thus allows mobile device 702 to wirelessly send and receive information about interactions with a provider system, such as using a dedicated application, a mobile application, or a website. Communications module 712 also allows mobile device 702 to request interaction with a human CSR.

Mobile device 702 also includes a battery 718 and a camera 720. Battery 718 provides the power source for mobile device 702. In some embodiments, camera 720 takes images of the user for facial recognition or provide for a video interaction between the user and the CSR, as opposed to a text chat or an audio-only interaction.

Figure 8:
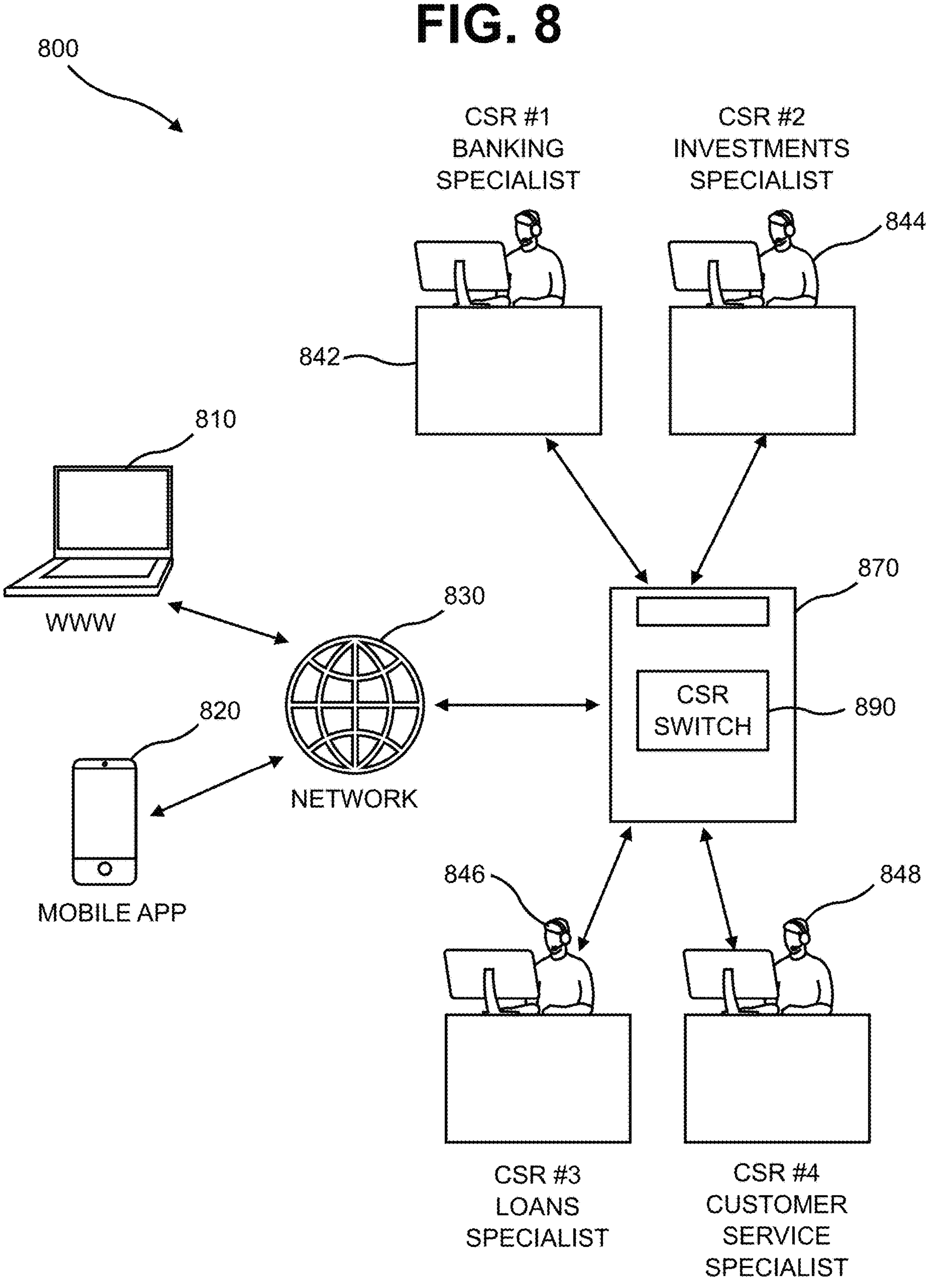
FIG. 8 is a schematic view of allowing a user of a provider system to interact with a customer service representative (CSR), according to an embodiment.

FIG. 8 is a schematic view 800 of allowing a user of a provider system to interact with a customer service representative (CSR), according to an embodiment. FIG. 8 shows that a user may interact with a provider system 870 over a network 830. The network 830 may be the Internet, a wide area network (WAN), a local area network, and so on. The user may interact with the provider system 870 using a web browser using a personal computer 810 or may access the provider system 870 using a smartphone 820.

However, if the user interacts with the provider system 870 using a smartphone 820, the user may interact using several different approaches. For example, the user may use a mobile application on the smartphone 820 designed to allow interaction between the smartphone 820 and the provider system 870. However, it is also possible to use the smartphone 820 to interact with the provider system 870 using a mobile browser. Additionally, smartphone 820 may interact with provider system 870 by using a voice interface to interact with the provider system 870 as an IVR system.

When the user wishes to interact with a CSR, the user may send a signal including a request to interact with a CSR over network 830 to the provider system 870. For example, the provider system 870 may include a CSR switch 890. Such a CSR switch 890 receives user tracking information, which allows the CSR switch 890 to connect the user to a particular CSR trained and designated for the user's specific needs. For example, FIG. 8 shows that there may be four CSRs. For example, there is CSR #1 banking specialist 842, CSR #2 investments specialist 844, CSR #3 loans specialist 846, and CSR #4 customer service specialist 848.

Some of these CSRs may have training in multiple areas. For example, CSR #2 investments specialist 844 may have specialized training in managing multiple types of investments, such as stocks, bonds, and mutual funds. However, if the CSR switch 890 routes the user to the wrong CSR, the CSR switch 890 may reroute the user. The CSR switch 890 may also record how it has rerouted the user in order to better connect the user to the provider system 870 once the user is done with the CSR.

For example, the CSR switch 890 may originally route the user to CSR #2 investments specialist #844. The CSR switch 890 may do so based on an understanding that the user would like advice on managing a mutual fund portfolio that requires human interaction that the provider system 870 cannot supply. However, such original routing may be incorrect, and the user may actually wish to get assistance with a savings account. In this situation, CSR #2 investments specialist 844 would realize that it would be more appropriate for the user to work with CSR #1 banking specialist 842.

Figure 9:
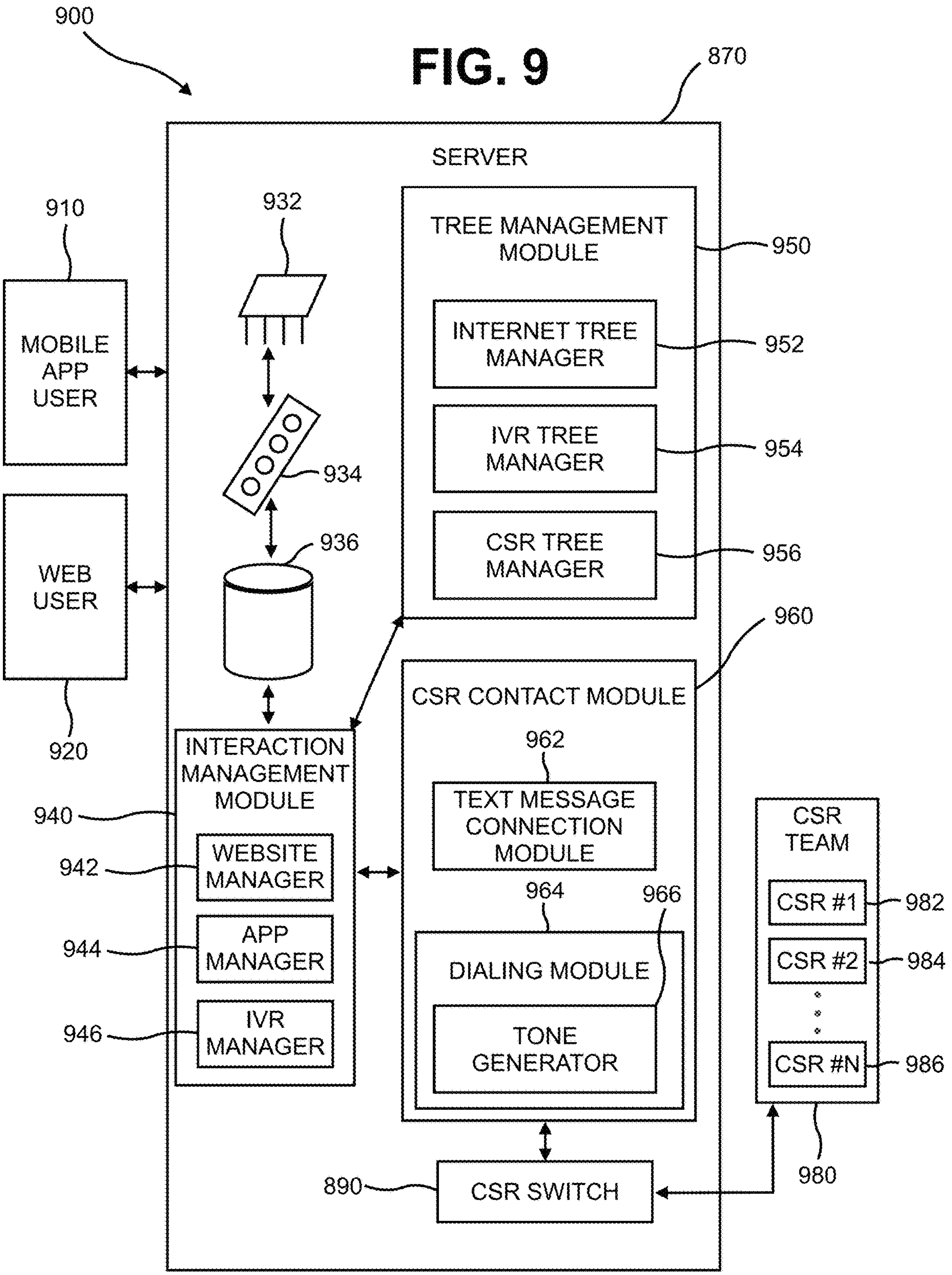
FIG. 9 is a schematic view of a provider system that facilitates interaction with a customer service representative (CSR), according to an embodiment.

FIG. 9 is a schematic view 900 of a provider system that facilitates interaction with a customer service representative (CSR), according to an embodiment. For example, server 930 may include at least one processor 932, and at least one memory 934. Processor 932 and memory 934 are illustrated as being connected to one another to share information. While processor 932 and memory 934 are each illustrated as being a single unit, processor 932 may include multiple processors or processors with multiple cores. Memory 934 may also take on different forms and may include multiple memory 934 elements. The server 930 may also include a long-term storage 936 used to store persistent information used to support the operation of the server 930.

The server 930 may also include an interaction management module 940. Such an interaction management module 940 interacts with the user during ordinary automated interaction, before the user requests an opportunity to interact with a CSR. For example, interaction management module 940 may include all or some of three sub-units, each of which is configured to manage an interaction between the user and the provider system before the interaction with the CSR. Interaction management module 940 may include a website manager 942, an app manager 944, and an IVR manager 946.

Here, each of these units manages a particular type of interaction. For example, the website manager 942 implements a website to allow interaction with the provider system. Such a website could allow a laptop or desktop personal computer to interact with the website. Alternatively, the website could be accessed by a mobile browser, such as by a smartphone, a tablet, or a phablet. Likewise, the app manager 944 may implement a mobile application that allows interaction with the provider system. Such a mobile application may be accessed by a mobile device, such as a smartphone, a table or a phablet. Alternatively, the app manager 944 may implement a dedicated application to interact with the provider system. Additionally, the IVR manager 946 could host an automated IVR that would allow the user to use the provider system using an IVR interaction approach.

The interaction management module 940 communicates with tree management module 950. For example, tree management module 950 may track the user's position in an appropriate hierarchy tree, such as shown in FIG. 4. For example, there may be a number of specialized tree managers to track the user's location in the relevant trees. For example, tree management module 950 may include an internet tree manager 952, an IVR tree manager 954, and a CSR tree manager 956.

For example, the internet tree manager 952 could track the user's position in a web/app tree 410 as shown in FIG. 4. For example, the IVR tree manager 954 could track the user's position in a IVR tree 430 as shown in FIG. 4. For example, the CSR tree manager 956 could track the user's position in a CSR tree 450 as shown in FIG. 4. Thus, as the user selects options provided by the provider system using various interfaces, the tree management module 950 uses the internet tree manager 952, the IVR tree manager 954, and the CSR tree manager 956 to track the user's interactions. Because the trees have parallel structures, it becomes possible to seamlessly shift between different modes of interacting with the provider system while preserving information that indicates how the user would like to interact with the system.

Once the interaction management module 940 establishes that a user would like to enlist the help of a CSR, there is a CSR contact module 960 that connects the user to the CSR. For example, such a CSR contact module 960 may perform the method of FIG. 6. The CSR contact module 960 may include a text message connection module 962 and a dialing module 964, where the dialing module may include a tone generator. Here, the text message connection module 962 connects the user to a CSR where the CSR interaction occurs through text messages sent between the user and the CSR.

Such interaction may take a number of forms. For example, the text messages may be SMS messages. However, the text messages may also be sent using a chat application or messaging application by a smartphone, or alternatively by using chat functionality of a web page or dedicated application. An aspect of these text messages is that the user may freely chat using text with a CSR. Furthermore, in some embodiments, the chat interaction may be supplemented with video, so that the user interacting with the CSR also sees a picture of the CSR. In such embodiments, the CSR may also be able to use screen sharing or show the user information using the video connection, thereby improving the ability of the CSR to communicate with and interact with the user.

In another embodiment, the CSR contact module 960 may connect the user to a CSR using an audio connection. To do so, the CSR contact module 960 may use a dialing module 964. The dialing module 964 translates the phone number to use to connect the user to the CSR into a signal that creates an audio channel between the user and the CSR.

For example, the phone number may be transformed into tones by a tone generator 966. For example, the tone generator 966 could transform the tones into dual-tone multi-frequency (DTMF) codes. The connection between the CSR contact module 960 and the CSR team 920 may use a CSR switch 890, corresponding to that illustrated CSR switch 890 shown in FIG. 8.

Thus, the systems and methods described herein provide for a facilitated way of connecting a user of a provider system with a customer service representative (CSR) in circumstances when automated interactions are not sufficient. A user may initially interact with a provider system using various automated approaches, such as by using a Internet-based solution (the World Wide Web, a dedicated application, or a mobile application) or an Interactive Voice Response (IVR) system. As the user interacts with the provider system, their interactions define a place in a hierarchy defined by the provider system.

The user may need the help of a human CSR. Embodiments gather information about the place in the hierarchy and characteristics of the user. Such information is transformed into a number. The number connects the user to a CSR who is well-suited to help them based on the information used to generate the number. Once the interaction with the CSR is complete, the embodiments can facilitate resuming interaction with the provider system, based on the previous place in the hierarchy and what transpired during the interaction with the CSR. Thus, the systems and methods described herein provide an improved way to connect users to sources of help and manage transitions between automated systems and connections with CSRs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A system for automatically facilitating communication with a human customer service representative (CSR), comprising:

at least one processor configured to:

provide a user with access to a provider system that includes an interactive voice response (IVR) system with a hierarchy of options;

store user tracking information describing interactions between the user and the provider system including a record of inputs made by the user while interacting with the provider system;

receive a request from the user to interact with a human;

match the user with the human CSR based on information for the user that includes one or more of access history information for the user, pre-existing preferences of the user, personality traits of the user, an importance of the user, demographics of the user, and special needs of the user;

retrieve tree codes associated with the user tracking information, the tree codes specifying a position of the user in the hierarchy of options of the IVR system;

obtain user session information including an alphanumeric identifier associated with the user;

transform the alphanumeric identifier to a numerical value;

generate a complete connection phone number based on the tree codes, the numerical value, and a CSR contact number; and initiate electronic contact between the user and the customer service representative by dialing the complete connection phone number, wherein the complete connection phone number:

connects the user to a particular human CSR trained and designated for the user's specific needs, and indicates to the human CSR an identity of the user, a task with which the user needs help, which accounts are associated with the user, and which access privileges the user has for the accounts.

2. The customer service system of claim 1, wherein the at least one processor is configured to store selections made using the (IVR) system as the user tracking information.

3. The customer service system of claim 1, wherein the at least one processor is configured to provide access to the provider system using a website for access and to store selections made using the website as the user tracking information.

4. The customer service system of claim 1, wherein the at least one processor is configured to provide access to the provider system using a mobile application for access and to store selections made using the mobile application as the user tracking information.

5. The system of claim 1, wherein the initiating electronic contact comprises converting the connection phone number into dual tone multi-frequency tones and using the dual tone multi-frequency tones to initiate contact with the human CSR.

6. The system of claim 1, wherein the initiating electronic contact comprises converting the connection phone number into a short message service message and using the short message service message to initiate contact with the human CSR.

7. The system of claim 1, wherein the at least one processor is further configured to identify the human CSR as a customer service representative having training based on at least one of the user tracking information and the user session information.

8. A method for automatically facilitating communication with a human customer service representative (CSR), the method comprising:

providing a user with access to a provider system that includes an interactive voice response (IVR) system with a hierarchy of options;

storing user tracking information describing interactions between the user and the provider system including a record of inputs made by the user while interacting with the provider system;

receiving a request from the user to interact with a human;

matching the user with the human CSR based on information for the user that includes one or more of access history information for the user, pre-existing preferences of the user, personality traits of the user, an importance of the user, demographics of the user, and special needs of the user;

retrieving tree codes associated with the user tracking information, the tree codes specifying a position of the user in the hierarchy of options of the IVR system;

obtaining user session information including an alphanumeric identifier associated with the user;

transforming the alphanumeric identifier to a numerical value;

generating a complete connection phone number based on the tree codes, the numerical value, and a CSR contact number; and initiating electronic contact between the user and the customer service representative by dialing the complete connection phone number, wherein the complete connection phone number:

connects the user to a particular human CSR trained and designated for the user's specific needs, and indicates to the human CSR an identity of the user, a task with which the user needs help, which accounts are associated with the user, and which access privileges the user has for the accounts.

9. The method of claim 8, further comprising storing selections made using the (IVR) system as the user tracking information.

10. The method of claim 8, further comprising providing access to the provider system using a website for access and storing selections made using the website as the user tracking information.

11. The method of claim 8, further comprising providing access to the provider system using a mobile application for access and storing selections made using the mobile application as the user tracking information.

12. The method of claim 8, further comprising converting the connection phone number into dual tone multi-frequency tones and using the dual tone multi-frequency tones to initiate contact with the human CSR.

13. The method of claim 8, further comprising converting the connection phone number into a short message service message and using the short message service message to initiate contact with the human CSR.

14. The method of claim 8, further comprising identifying the human CSR as a customer service representative having training based on at least one of the user tracking information and the user session information.

15. A system for automatically facilitating communication with a human customer service representative (CSR) comprising one or more computers and one or more storage devices storing instructions that are operable, when executed by the one or more computers, to cause the one or more computers to:

provide a user with access to a provider system that includes an interactive voice response (IVR) system with a hierarchy of options;

store user tracking information describing interactions between the user and the provider system including a record of inputs made by the user while interacting with the provider system;

receive a request from the user to interact with a human;

match the user with the human CSR based on information for the user that includes one or more of access history information for the user, pre-existing preferences of the user, personality traits of the user, an importance of the user, demographics of the user, and special needs of the user;

retrieve tree codes associated with the user tracking information, the tree codes specifying a position of the user in the hierarchy of options of the IVR system;

obtain user session information including an alphanumeric identifier associated with the user;

transform the alphanumeric identifier to a numerical value;

generate a complete connection phone number based on the tree codes, the numerical value, and a CSR contact number; and initiate electronic contact between the user and the customer service representative by dialing the complete connection phone number, wherein the complete connection phone number:

connects the user to a particular human CSR trained and designated for the user's specific needs, and indicates to the human CSR an identity of the user, a task with which the user needs help, which accounts are associated with the user, and which access privileges the user has for the accounts.

16. The system of claim 15, wherein the instructions further cause the one or more computers to store selections made using the Interactive Voice Response system as the user tracking information.

17. The system of claim 15, wherein the instructions further cause the one or more computers to provide access to the provider system using a website for access and store selections made using the website as the user tracking information.

18. The system of claim 15, wherein the instructions further cause the one or more computers to provide access to the provider system using a mobile application for access and store selections made using the mobile application as the user tracking information.

19. The system of claim 15, wherein the instructions further cause the one or more computers to convert the connection phone number into dual tone multi-frequency tones and using the dual tone multi-frequency tones to initiate contact with the human CSR.

20. The system of claim 15, wherein the instructions further cause the one or more computers to convert the connection phone number into a short message service message and using the short message service message to initiate contact with the human CSR.

* * * * *